United States Patent Office 2,837,181
Patented June 3, 1958

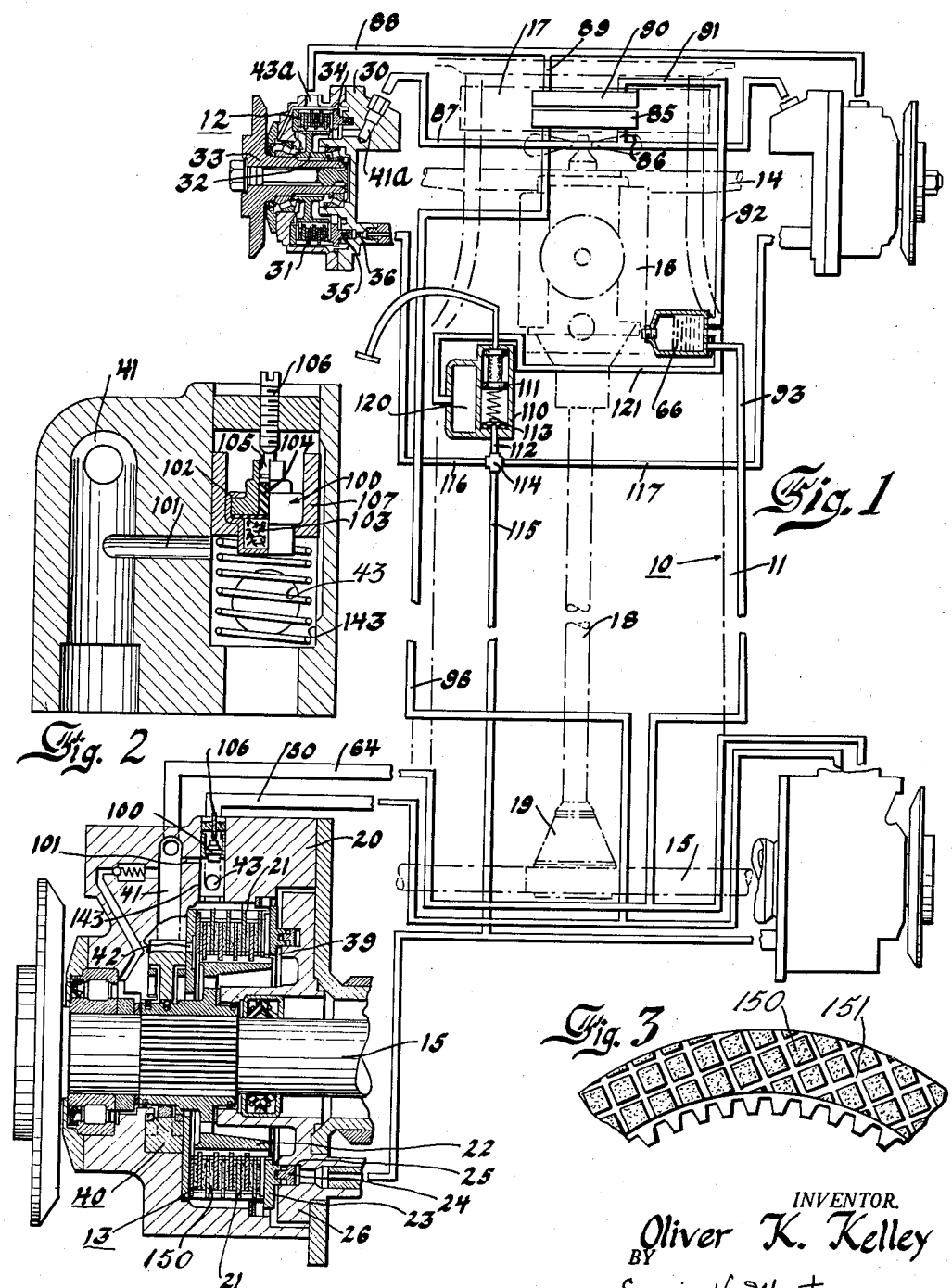

2,837,181

FLUID COOLING SYSTEM FOR LIQUID COOLED FRICTION BRAKES

Oliver K. Kelley, Bloomfield Hills, Mich., assignor to General Motors Corporation, Detroit, Mich., a corporation of Delaware Application August 22, 1955, Serial No. 529,670

7 Claims. (Cl. 188—264)

This invention relates to a cooling system for circulating the cooling fluid through friction brakes to remove the heat of friction and to control apparatus for regulating the flow of coolant.

One of the problems concerning the use of liquids in cooling systems for use on motor vehicles that operate under wide temperature conditions involves the change in viscosity of the liquids used in the cooling system resulting from atmospheric temperature changes. It is well known that when the temperature of liquids is reduced, the viscosity of the liquid substantially increases. Since automotive vehicles operate at temperatures from conditions of desert heat to frigid arctic conditions, the viscosity of the liquid used in a cooling system will vary over a wide range.

As the viscosity of the liquid increases, the friction loss created as a result of transfer of the liquid through a circulating system by means of a pump operated by the engine of a vehicle will result in a less efficient operation of the vehicle engine, since the more viscous cooling liquid circulated through the brakes for cooling results in a greater pressure drop in the circulating system and a greater friction drag between the rotating and stationary plates even when the brake is in a released condition.

As a result, it is desirable that under low temperature conditions, the temperature of the cooling fluid be brought to an optimum operating temperature as rapidly as possible to reduce pressure drop of the liquid circulating in the system and the friction drag created by the viscous liquid as quickly as possible after the motor vehicle has started its operation.

It is therefore an object of this invention to provide a liquid circulating system for circulating a coolant or cooling fluid through friction brakes of a vehicle in which the circulating fluid is maintained in a minimum circulation system within the brakes of a vehicle until such time as the temperature of the cooling fluid reaches a predetermined minimum optimum temperature.

It is another object of the invention to provide a fluid circulating cooling system for friction brakes of a vehicle wherein a pump is carried by a wheel or wheels of the vehicle for circulating cooling fluid through the brakes of the vehicle with the pump being operably connected with a thermally actuated valve by which the cooling fluid is circulated from the outlet directly to the inlet of the pump without passage through any heat exchange medium which tends to cool the liquid until after the cooling liquid has reached a minimum optimum operating temperature.

It is another object of the invention to provide a fluid circulating system for cooling friction brakes in accordance with the foregoing object wherein the thermally actuated valve will be effective to cause the circulating cooling fluid to by-pass completely a heat exchange circuit external of the wheel carrying the circulating pump and maintain pump circulation entirely within the brake and wheel until the temperature of the circulating fluid reaches a predetermined minimum temperature.

Further objects and advantages of the present invention will be apparent from the following description, reference being had to the accompanying drawings wherein a preferred form of the invention is clearly shown.

In the drawings:

Figure 1 is a schematic view illustrating a fluid circulating system for the friction brakes of a vehicle incorporating features of this invention.

Figure 2 is a cross sectional view of a thermally responsive valve for controlling the circulation of cooling fluid in the system shown in Figure 1.

Figure 3 is an elevational view of a portion of one of the disks of a friction brake.

In Figure 1 there is illustrated schematically a system for cooling friction brakes of a vehicle similar to that disclosed in my co-pending application S. N. 516,294, filed June 17, 1955 in which a thermally responsive valve is placed in the fluid circulating lines of a heat exchange system to reduce the effect of cooling of the circulating fluid in the heat exchange system until the temperature of the cooling fluid circulating in a minimum portion of the heat exchange system reaches a predetermined minimum temperature.

In this invention a thermally responsive valve is carried by the wheel of the vehicle that carries the pump for circulating the cooling fluid with the valve controlling a by-pass passage between the outlet and inlet of the pump to retain all circulating cooling fluid in circulation within the brake and wheel carrying the pump until the temperature of the fluid in the by-pass circulating circuit reaches a predetermined minimum temperature. This arrangement completely by-passes all heat exchangers and circulating lines that can also act as a heat exchange medium.

In the drawing there is shown a vehicle 10 on which the brake system of this invention is applied. The vehicle 10 comprises a conventional frame 11 on which there is supported front wheel brakes 12 and rear wheel brakes 13. The front wheel brakes are supported on the usual suspension system carried on a cross frame member 14. The rear wheel brakes 13 are carried on the rear axle 15.

The frame 11 also supports a vehicle engine 16 operably connected with a radiator 17 through which water is circulated for cooling the engine. The engine 16 is connected to the rear axle through a conventional drive shaft 18 and differential 19.

The rear wheel brakes 13 each comprise a stationary housing 20 containing a multiple disk assembly 21 providing the friction brake. Some of the disks of the assembly 21 are carried by the stationary housing 20 while other of the disks are supported upon the rotating hub 22 that is supported upon the rear axle 15. The brake disks of the disk assembly 21 are brought into frictional engagement for a braking operation by means of actuation of a pressure plate 23 having an annular projection 24 that operates in an annular groove 25 provided in the housing member 26 whereby to provide a wheel cylinder to receive hydraulic brake actuating fluid.

The front wheel brake 12 consists of a stationary housing 30 that encloses a multiple disk assembly 31 forming the friction brake. Some of the disks of the assembly 31 are carried by the stationary housing 30 while others of the disks are carried by the rotating hub 32 that in turn is supported on the rotating axle spindle 33. A pressure plate 34 is provided at one side of the disk assembly 31 and has an annular projection 35 positioned in an annular groove 36 that forms a wheel cylinder for receiving hydraulic fluid under pressure from a hydraulic actuating system for operation of the brake.

The rear brake 13 includes a vane type pump 40 that is keyed to the hub 22 so as to effect circulation of fluid by the pump when the wheel axle 15 is rotated. The pump 40 receives fluid through the suction inlet 41 and delivers fluid under pressure through an outlet passage 42 into the brake chamber 39 that contains the disk assembly 21. Fluid under pressure is circulated between the disk assembly 21 and is discharged from the housing through the passage 43.

Similarly, fluid under pressure is delivered into the front wheel brake 12 through an inlet passage 41a for circulation between the disks 31 and is discharged from the brake 12 through a passage 43a.

Both front and rear wheel brakes 12 and 13 have either the stationary disks or the rotating disks provided with a friction facing material 150 that is provided with grooves 151 as shown in Figure 3 for passage of cooling fluid between the disks when they are in operating engagement.

It will thus be seen that both the front and rear wheel brakes 12 and 13 are constructed and arranged to receive fluid under pressure for circulation through the brake to remove the heat of friction caused by braking engagement of the disk assemblies 21 and 31, the rear wheel brake 13 being provided with a pump to effect the desired circulation of fluid through both the front and rear brakes through a circulating system hereinafter described.

The particular structure of the front and rear wheel brakes 12 and 13 is more fully disclosed and described in the copending application of Kelley, Hause, Heck, S. N. 516,282, filed June 17, 1955.

The fluid circulating system for the circulation of cooling fluid through the front and rear wheel brakes includes a fluid discharge line 50 that receives fluid under pressure from the pumps 40 of the rear wheel brake assemblies as exhausted from the brakes through the port 43. Since both rear wheel brakes are identical in structure, only one is described and referred to.

The fluid under pressure in the discharge line 50 connects with a fluid circulating line 96 through which fluid under pressure is delivered to a heat exchanger 85 that is located in the bottom portion of the engine radiator 17. The outlet line 86 of heat exchanger 85 is connected by means of a fluid circulating line 87 with the inlet passage 41a of the front wheel brake 12.

The fluid circulated through the front wheel brake 12 is exhausted through the passage 43a into the fluid circulating line 88 that in turn is connected through the line 89 with the inlet side of a second heat exchanger 90 also located in the bottom portion of the engine radiator 17 and adjacent the heat exchanger 85. The discharge line 91 of the heat exchanger 90 connects with a fluid circulating line 92 that is connected with the fluid reservoir 66. The fluid reservoir 66 is connected by means of a fluid circulating line 93 with the inlet line 64 that delivers fluid into the suction inlet 41 for the pump 40.

In the system thus far described the pump 40 will continuously circulate cooling fluid through the circulating system whenever the wheel axle 15 rotates. However, under low temperature atmospheric conditions the viscosity of the cooling fluid will be considerably higher than under high temperature atmospheric conditions. If the pump 40 is to circulate cooling fluid through the circulating system under the low temperature conditions, the fluid will be cooled in the heat exchangers 85 and 90 with the result that the temperature of the cooling fluid will remain at a low value for a considerable period of time, the resulting high viscosity of the fluid effecting a high pressure drop through the circulating system and high friction in circulation through the disk brake assembly 21, with the result that high power loss is obtained at the axle 15.

In this invention therefore there is provided a thermally responsive device 100 that controls a by-pass port 101 between the discharge passage 43 from the exhaust side of the brake chamber 39 and the inlet passage 41 to the pump 40. When the by-pass port 101 is open, as illustrated in Figure 2, the cooling fluid circulated by the pump will circulate only internally of the wheel containing the pump, the resistance to flow in the conduit lines of the circulating system being sufficient to resist circulation of fluid in the circulating system so long as the by-pass port 101 remains open.

The thermally responsive device 100 comprises a body 102 containing an expansible mass 103 that expands upon a rise in temperature. Expansion of the mass 103 causes the resilient rubber plug 104 to move the plunger 105 against the adjusting screw 106 to cause the piston 107 that carries the thermally responsive device 100 to move downwardly in the chamber 43 and thereby close off the by-pass port 101.

The thermally responsive device 100 is illustrated in the drawing in the position it attains when the ambient or atmospheric temperature conditions are relatively low.

It is desirable for the coolant or cooling fluid to rise to a temperature of about 180° F. as quickly as possible, and thereafter remain at substantially this temperature during circulation through the wheel brakes to remove heat of friction from the brakes. Thus the thermally responsive device 100 is adapted to maintain the by-pass port 101 open until the temperature of the coolant circulating from the exhaust chamber 43 through the by-pass port 101 and into the suction inlet 41 to the pump 40 reaches a temperature of about 180° F. When this temperature condition is reached the piston 107 will close the by-pass port 101 and force the coolant to flow through the exhaust line 50 into the coolant circulating system for removal of heat by the heat exchangers 85 and 90, and for circulation through the front wheel brakes as well as the rear wheel brakes.

It will thus be seen that the placement of the thermally responsive device 100 in the wheel that contains the pump for circulating the fluid in the circulating system will provide for circulation of the cooling fluid only internally of the wheel that contains the pump so long as the temperature of the coolant remains below a predetermined minimum value. The arrangement is such therefore as to avoid any cooling of the cooling fluid in any part of an external circulating circuit so that the temperature of the cooling fluid will rise to its predetermined minimum value as quickly as possible to allow for a reduction in viscosity of the fluid before it begins its circulating path in the circulating system in heat exchange relationship with the heat exchangers 85 and 90.

The front and rear wheel brakes are operated by a hydraulic actuating system that includes a master cylinder 110 having a displacement piston 111 therein for delivering fluid under pressure into the supply line 112. A check valve 113 of conventional type is provided in the master cylinder 110 to retain a residual pressure in the supply line 112 whenever the brakes are in a released condition. The supply line 112 connects with a junction block 114 that in turn has the supply lines 115, 116, and 117 extending therefrom to supply the annular grooves 25 and 36 of the rear and front brakes 13 and 12 respectively.

The master cylinder 110 is provided with a fluid reservoir 120 from which make-up fluid is supplied to the master cylinder for any loss of fluid occurring in the hydraulic actuating brake system. The reservoir 120 is connected by means of a pipe line 121 with the reservoir 66 of the cooling fluid circulating system so that the reservoir 66 will in turn supply fluid to the master cylinder so long as any fluid is present in the cooling fluid circulating system.

In Figure 1 of the drawing, the reservoir 66 is illustrated as being alongside the master cylinder 110 and its reservoir 120, but in actual practice the reservoir 66 will be positioned at a higher level than the reservoir 120 of the master cylinder 110 so that fluid from the reservoir 66 will drain by gravity into the reservoir 120 for supply of fluid thereto so long as any fluid enters the reservoir 66. This arrangement insures a supply of hydraulic fluid to the hydraulic actuating system for the brakes so long as there is any fluid existing in the fluid cooling circulating system. Thus the operator of the vehicle will be in a position to actuate the brakes irrespective of whether or not they are being cooled, and under emergency conditions will therefore be able to bring the vehicle to a stop.

While the form of embodiment of the invention herein disclosed constitutes a preferred form, it is to be understood that other forms might be adopted as may come within the scope of the claims which follow.

What is claimed is as follows:

1. Brake mechanism for a vehicle, comprising in combination, a vehicle wheel including brake means for the wheel, pump means within the wheel to circulate cooling fluid through said brake means, means providing a heat exchange circuit means including heat exchange means externally of the wheel connected with said pump and brake to effect cooling of said circulating cooling fluid, and flow control valve means carried by said wheel responsive to the temperature of cooling fluid from the brake means to effect flow circulation of the cooling fluid from the brake means to the pump means in by-pass relation to the external heat exchange circuit and heat exchange means when the temperature of the cooling fluid from the brake means is below a predetermined value.

2. Brake mechanism for a vehicle, comprising in combination, a vehicle wheel including brake means for the wheel, pump means within the wheel to circulate cooling fluid through said brake means, means forming an exhaust passage from the brake means to exhaust cooling fluid from the brake means, means forming an inlet passage to the said pump, means providing a heat exchange circuit means externally of the wheel including heat exchange means and conduit means connecting the heat exchange means with said exhaust passage means and said inlet passage means for flow circulation therebetween, and flow control valve means carried by said wheel responsive to the temperature of cooling fluid from the brake means to effect flow circulation of the cooling fluid from the said exhaust passage means to the said inlet passage means internally of the wheel in by-pass relation completely of the heat exchange circuit and the heat exchange means when the temperature of the cooling fluid from the brake means is below a predetermined value.

3. Brake mechanism for a vehicle, comprising in combination, a vehicle wheel including cooperating rotatable and stationary brake disk means to effect brake operation, pump means within the wheel effecting discharge of cooling fluid to one edge of the said brake-disk means, said brake-disk means having cooperating engaging faces contoured to provide for flow of fluid between the faces when engaged, means forming an exhaust passage for flow of cooling fluid from the opposite edge of the brake-disk means, means forming an inlet passage for said pump means, means forming a heat exchange circuit externally of the wheel including a heat exchange means and conduit means connecting the same in flow relationship between said exhaust passage means and said pump inlet passage means, and flow control valve means carried by said wheel responsive to the temperature of the cooling fluid as it discharges into said discharge passage means to effect flow circulation of the cooling fluid from the discharge passage means directly into said pump inlet passage means to by-pass completely thereby said heat exchange circuit when the temperature of the cooling fluid discharging into the discharge passage means is below a predetermined value.

4. Brake mechanism for a vehicle, comprising in combination, a vehicle wheel including cooperating rotatable and stationary brake disk means to effect brake operation, pump means within the wheel effecting discharge of cooling fluid to one edge of the said brake-disk means, said brake-disk means having cooperating engaging faces contoured to provide for flow of fluid between the faces when engaged, means forming an exhaust passage for flow of cooling fluid from the opposite edge of the brake-disk means, means forming an inlet passage for said pump means, means forming a by-pass passage between said exhaust passage means and said inlet passage means, means forming a heat exchange circuit externally of the wheel including a heat exchange means and conduit means connecting the same in flow relationship between said exhaust passage means and said pump inlet passage means, and flow control valve means carried by said wheel responsive to the temperature of the cooling fluid as it discharges into said discharge passage means to close said by-pass passage when the temperature of the cooling fluid discharging into the discharge passage means reaches a minimum predetermined value to effect thereby flow circulation through said heat exchange circuit including said heat exchange means.

5. In a vehicle, the combination of, a plurality of wheels each having brake means therein each constructed and arranged for flow of fluid coolant therethrough, a heat exchange circuit including heat exchange means connected with the said brake means for cooling the coolant circulated through the brake means, pump means in some of the wheels and driven thereby and connected with said heat exchange circuit for positive circulation of fluid through the said circuit and the brake means connected therewith, and coolant flow control valve means in the wheel containing the said pump means responsive to temperature of the coolant in the said wheel providing for positive circulation only within the wheel containing the said pump means so long as the coolant temperature is below a predetermined value and providing for positive coolant circulation through all of said brake means and the said heat exchange circuit when the coolant temperature is above the said predetermined value.

6. Apparatus in accordance with claim 5 in which each of the brake means includes a plurality of stationary and rotatable cooperating disk plate means contoured to provide for circulation of coolant between the said plate means when they are in engaged relationship to effect thereby heat removal from the said plate means during the period of time of their engagement.

7. In a vehicle, the combination of, a plurality of wheels each having brake means therein each constructed and arranged for flow of fluid coolant between the brake elements when in engaged condition, pump means in some of the wheels and driven thereby to effect positive circulation of coolant fluid through the brake means in the wheels containing the pump means, each of said brake means having means forming a passage for exhaust of coolant fluid from the respective brake means, each of said brake means also having means forming an inlet passage for receiving coolant fluid to the brake means, the said inlet passage of the brake means in the wheels containing the pump means having the pump means disposed in the said fluid inlet passage, means forming a by-pass passage in the wheels containing the pump means providing for flow of coolant from the brake means in the said wheel directly into the inlet for the pump means in the said wheel, and coolant flow control valve means in the wheel containing the said pump means responsive to temperature of the coolant in the said discharge passage means providing for positive circulation only within the wheel containing the said pump means so long as the coolant temperature is below a predetermined value and providing for positive coolant circulation through all of said brake means and the said heat exchange circuit when the temperature is above the said predetermined value.

References Cited in the file of this patent

UNITED STATES PATENTS

| | | |
|---|---|---|
| 1,380,584 | Parker | June 7, 1921 |
| 2,351,180 | Ash | June 13, 1944 |
| 2,457,618 | Wiesendanger | Dec. 28, 1948 |
| 2,541,227 | Findley | Feb. 13, 1951 |